United States Patent [19]

Tabata

[11] 4,242,681
[45] Dec. 30, 1980

[54] DRIVING SYSTEM FOR DISPLAY

[75] Inventor: Junichi Tabata, Tokyo, Japan

[73] Assignee: Kabushiki Kaisha Daini Seikosha, Tokyo, Japan

[21] Appl. No.: 933,087

[22] Filed: Aug. 11, 1978

[30] Foreign Application Priority Data

Aug. 16, 1977 [JP] Japan .................... 52-98123

[51] Int. Cl.³ .............................. G09F 9/32
[52] U.S. Cl. .............................. 340/785; 340/763
[58] Field of Search .......... 350/357, 362, 355, 356; 340/763, 785, 789, 791, 811; 307/293, 269, 208; 328/48

[56] References Cited

U.S. PATENT DOCUMENTS

| 3,096,271 | 7/1963 | Hespenheide | 340/785 X |
| 4,006,585 | 2/1977 | Tamaru et al. | 350/357 X |
| 4,150,362 | 4/1979 | Uede et al. | 350/357 X |

Primary Examiner—James W. Davie
Attorney, Agent, or Firm—Robert E. Burns; Emmanuel J. Lobato; Bruce L. Adams

[57] ABSTRACT

A driving system for an electro chromic display, comprising a display information signal generator, a generator of a coloring pulse and an erasing pulse, a memory time counter, a refresh pulse arrange circuit and a driver. The display means is refreshed when a memory time determined by the memory time counter has elapsed, to maintain color regularity.

2 Claims, 4 Drawing Figures

DRIVING SYSTEM FOR DISPLAY

BACKGROUND OF THE INVENTION

This invention relates to a driving system for an electro chromic display (refered to as EC hereinafter) colored and erased reversibly by electric energy, and particularly a driving system which refreshes the memory in the case where the display is executed, by using a memory function which keeps the coloring state for several hours of several days even after the cutting of a coloring voltage of EC.

Conventionally, the liquid crystal and the luminous diode are put to practical use in many fields as the display element for the small-sized digital display.

But they were not always satisfactory elements for the display of small-sized machinery such as watches, since the liquid crystal is indistinct under dim light while having a merit of low-electric consumption. On the contrary, the luminous diode has a high-electric consumption and is indistinct under bright light, while having a merit of clearness under dim light.

For that reason, EC which needs lower electric consumption than the luminous diode and provides a better display effect than the liquid cristal, has being studied energetically. The features of this EC are as follows:

(1) A visual field is remarkably wide.

(2) The life is determined by the times of the coloring-erasing cycles.

(3) The energy consumption is from several to several ten times $mc/cm^2$, and is increased in proportion to the cycle times.

(4) It has a memory function which keeps the coloration state for several hours of several days after the cutting of the coloring voltage.

DESCRIPTION OF THE PREFERRED EMBODIMENT

Figure 1:
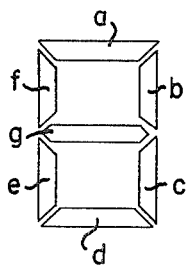
FIG. 1: The arrangement of a numeral display pattern formed as an 8.

Referring now to the display using said EC as one of the embodiments with a numeral composed by seven EC segments shown in FIG. 1.

When a numeral "2" is displayed, segments a,b,g,e,d are colored, and to change said numeral "2" into "3", the respective display states of segments c and e must be changed. Therefore the saving of energy consumption is achieved by the driving system in which only the segment e is erased and c is colored and the others a,b,g,d are kept in a coloring state by using a memory function without applying a current.

Figure 2:
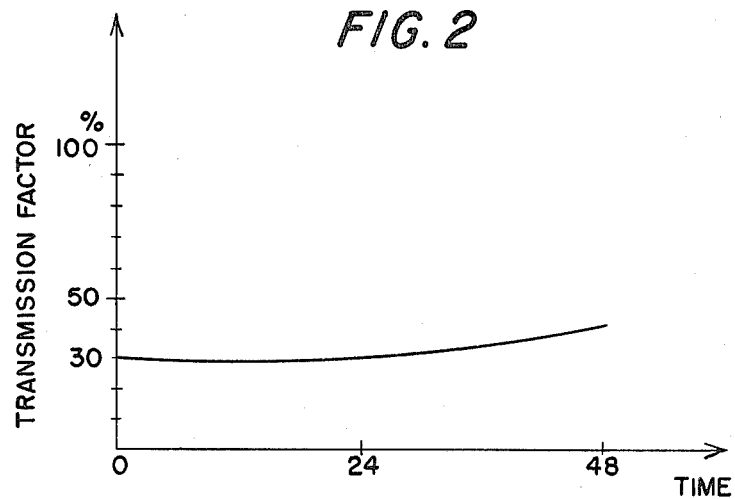
FIG. 2: A graph showing the change with time of the light transmission factor after the cutting of the coloring voltage.

As illustrated in FIG. 2, the coloring density fails by degrees with the memory time. Therefore, if a numeral "3" is displayed for a certain time, only the segment c becomes clear and makes a difference with the segments which have been displayed for a certain different time. And the difference of color density of the segments which have different memory times, makes a color irregularity.

The object of this invention is to eliminate such a condition. A memory time counter and a refresh pulse arrange circuit are provided and when the preset time is over after the starting of memory, a refresh pulse is generated and it perform a revision of the color density.

Figure 3:
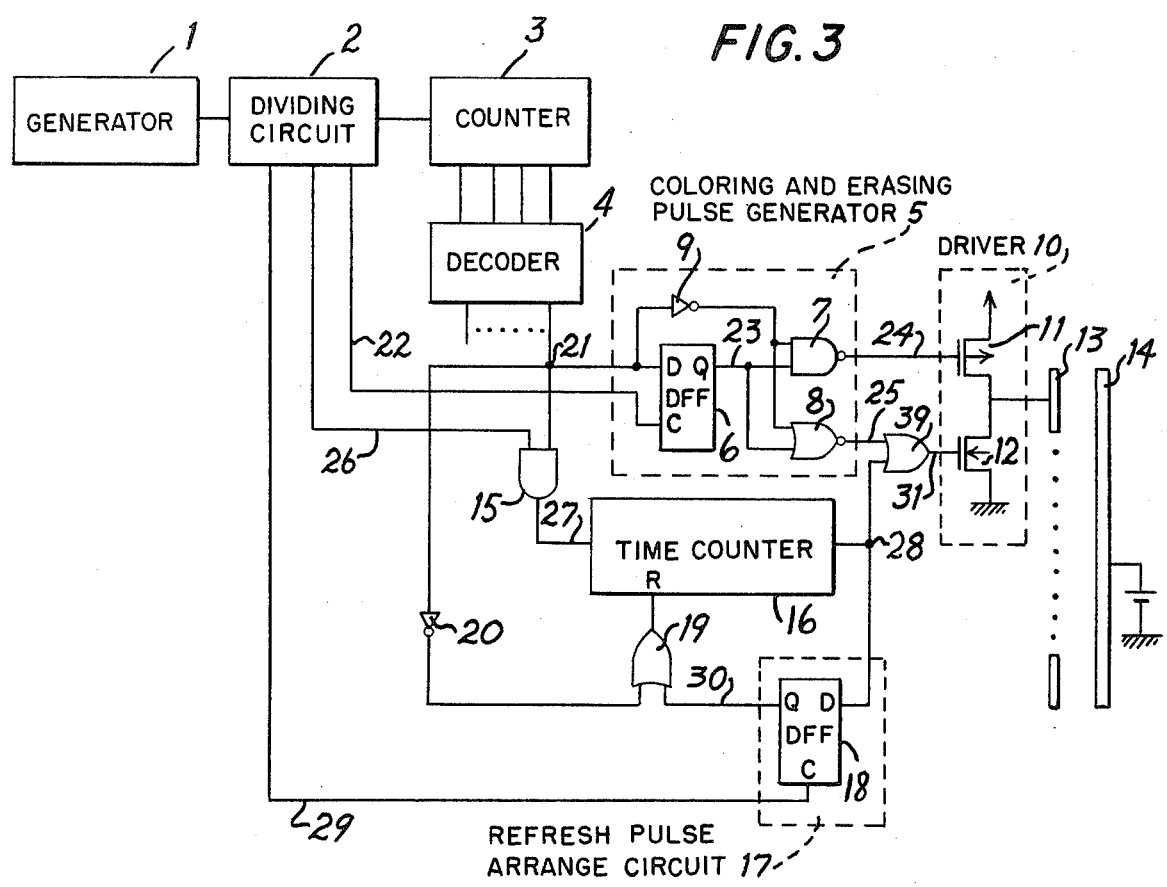
FIG. 3: A driving circuit of this invention.

This invention will be explained in conjunction with the drawings. FIG. 3 is a circuit of the driving system of this invention, which displays time as one example of display informations. To avoid complexty, only one digit is shown, but other digits are also similarily structured.

The time base signal generated in the oscillator 1 is divided in a divider 2 and applied to a counter 3. An information in the counter 3 is sent to a decoder 4 and converted into a display information signal, and sent to a generator 5 for generating a coloring pulse and an erasing pulse. A delay type flipflop (refered to DFF hereinafter) 6 is provided to delay the display information signal.

A data input terminal D is connected to an output terminal of the decoder 4 and a clock input terminal C is connected to one of the dividing outputs 22 of the divider 2.

NORGATE 8 is a logic gate which makes pulse signals synchronized at a positive going edge of a display information signal.

Display information signals are applied to one of the input terminals of said NORGATE via an inverter 9, and another input terminal is connected to an output terminal Q of DFF 6. NANDGATE 7 is a logic gate which makes pulse signals synchronized at the positive going edge of a display information signal. Display information signals are applied to one of the input terminals of said NANDGATE 7 via the inverter 9, and another input terminal is connected to the output terminal Q of DFF 6.

One of the input terminals of ORGATE 39 is connected to an output terminal of the NORGATE 8, and another input terminal is connected to an output terminal of a memory time counter 16.

A driving circuit 10 comprises a P channel MOSFET (refered to as P-MOS hereinafter) 11, and a N channel MOSFET (refered to as N-MOS hereinafter) 12. The gate electrode of P-MOS is connected to an output of NANDGATE 7, a source electrode is connected to a high electric potential level of a source of electricity, a gate electrode of N-MOS 12 is connected to an output of the ORGATE 39, a source electrode is connected to a low electric potential level (0v) of the source of electricity, and a drain electrode is connected to a drain electrode of P-MOS 11 and becomes an output of the driving circuit 10 and is connected to a segment electrode 13 of EC. An opposed electrode 14 is connected to a half electric potential level (1.5 v) equal to one half of the potential of the source of electricity.

One of the input terminals of ANDGATE 15 is connected to an output terminal of the decoder 4, another input terminal is connected to one of the outputs 26 of the dividing circuit 2 and an output terminal is connected to an input terminal of the memory time counter.

An output terminal of the memory time counter 16 is connected to one of the input terminals of ORGATE 39 and at the same time, it is connected to a data input terminal of DFF 18 which constitutes a refresh pulse arrange circuit 17. A clock input terminal of DFF 18 is connected to one of the dividing outputs 29 of the dividing circuit 22.

One of the input electrodes of a ORGATE 19 is connected to an output terminal Q of DFF 18, another terminal is connected to an output of the decoder 4 via an inverter 20, and the output terminal is connected to a reset terminal R of the memory time counter.

Figure 4:
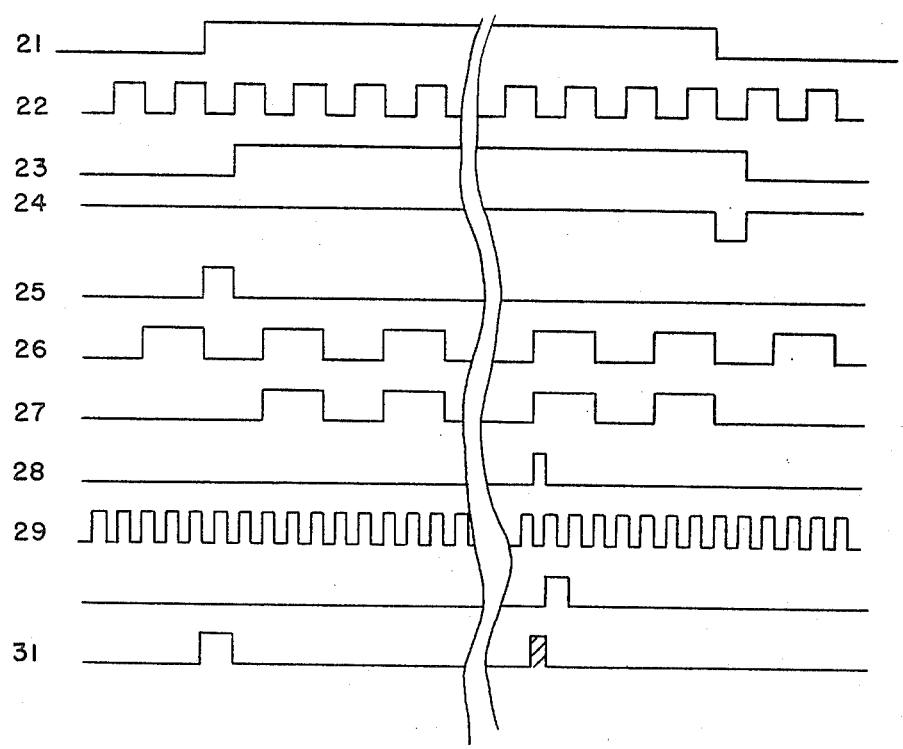
FIG. 4: A timing chart of signal waveforms developed during operation of the circuit illustrated in FIG. 3.

FIG. 4 shows a timing chart of signals developed in each part of the circuit illustrated in FIG. 3. Numerals 21–31 in the circuit correspond to the signal numerals 21–31. Referring now to a circuit operation according to the time chart of FIG. 4.

Referring first to a coloring process. A time base signal generated by oscillator 1 is divided in a dividing circuit 2 and applied to a counter 3. The information in the counter 3 is sent to a decoder 4 and is converted into a display information signal 21. When the display information signal 21 alters from the logic level "low" (refered to "L" hereinafter) to as high (refered to "H" as hereinafter), which is an order for the coloring of segments, an output of an inverter 20 alters from "H" to "L", and since an output of DFF 18 is at the logical level "L", an output of ORGATE 19 changes to logical level "L", and a reset function of the memory time counter 16 is released. At the same time, ANDGATE 15 opens the gate and lets a dividing signal 26 of the dividing circuit pass during the time the display information signal is on the logic level "H". A signal 27 is an output signal of ANDGATE 15, and is applied into the memory time counter 16 and becomes a signal for the calculation of the coloring time.

The memory time counter 16 is designed in advance in order that it may change the output signal from the logic level "L" to "H" when a refresh is necessary, and at the moment of the appearence of the coloring order, the output is on the logical level "L".

On the other hand, when the display information signal 21 alters from the logical level "L" to "H", which is an order of the coloration, since DFF 6 generates an output signal at the output terminal Q at a positive going edge of the delay clock signal 22, an output signal 23 becomes a signal 21 with a delay of a half cycle of a signal 22. At this time, an output signal 24 of NAND-GATE 7 is on the logical level "H", P-MOS 11 is under the off condition, on the other hand, an output signal 25 of NORGATE 8 is synchronized at the positive going edge of the display information signal 21, and generates on positive pulse, i.e. a half cycle of the signal 22, and is applied to a gate electrode of N-MOS 12 across OR-GATE 39. N-MOS 12 is under the on condition during the period of generation of the positive pulse, and connects the segment electrode 13 to a low electric potential level, and makes a coloring material precipitate on a surface of the segment electrode 13, and then maintains the coloring state by the memory function.

Referring next to the refresh movement. When the display informaiton signal 21 changes from the logic level "L" to "H", the memory time counter 16 starts counting the coloring time.

And when the preset time is over, an output signal 28 of the memorial counter 16 changes from the logic level "L" to "H" and is applied into the DFF 18 which constitutes a refresh pulse generator 17.

When a delay signal 29 is applied to a clock input terminal C of DFF 18, a signal 30 appears at an output terminal Q of DFF 18. DFF 18 has a function of putting out data as an output signal at a positive edge going of the delay signal. And the output signal 30 of DFF 18 changes from the level "L" to "H" with a delay of a half cycle of the signal 29, after the signal 28 has changed from the level "L" to "H", and it makes the memory time counter 16 via ORGATE 19, and changes from the logical level "H" to "L" with a delay of one cycle of the delay signal 29. Therefore, when a preset time is over, the output signal 28 of the memory time counter 16 generates a refresh pulse shown by oblique lines on an output signal 31 of ORGATE 39.

During a period of a refresh pulse generation, N-MOS 12 becomes conductive and connects a segment electrode 13 to a low electric potential level, and educes a coloring material on a surface of the segment electrode 13 to refresh the color darkness. A refresh time is variable by changing a cycle of the signal 29.

When the memory time is long, the memory time counter 16 is reset at a positive pulse, and after a clearance of the contents of the counter, calculates again a memory time. And when the preset time is over again, a refresh pulse is generated and this action is repeated during the memory time.

Referring next to an erasing action. When a display information signal 21 have changed from the level "H" to "L", and orders a erasing, the memorial time counter 16 is reset via an inverter 20 and ORGATE 19, and suspends the count until the display information signal 21 changes from level "L" to "H".

On the other hand, when the display information signal 21 changes from the level "H" to "L" and orders the segment erasing, an output signal 23 of DFF 6 appears as a display information signal 21 with a delay of a half cycle of the delay signal 22.

At this moment, an output signal 25 of NORGATE 8 is on the level "L", and an output signal of ORGATE 39 becomes on the level "L", too. And N-MOS 12 is non-conductive and an output signal 24 of NAND-GATE 7 is synchronized at a negativegoing edge of the display informaiton signal 21 and becomes a negative pulse, i.e. a half cycle of the delay signal 22.

During the period of a generation of said negative pulse, P-MOS 11 is conductive and connects the segment electorode 13 to a high electric potential level and erases an EC display.

When both of the P-MOS and N-MOS are non-conductive, the EC display memorizes the information and keeps the coloring or the erasing state.

As mentioned above, according to this invention, by having a memory time counter and a refresh pulse arrange circuit, a refresh pulse is generated when the preset memorial time is over, and a darkness revision is accomplished. Therefore, the color irregularity can be prevented, and the EC display with a good display effect can be obtained.

I claim:

1. In a driving system for an electrochromic display including a display information signal generator, a coloring and erasing pulse generator and electrochromic display means for displaying information in response to the coloring and erasing pulses, the improvement comprising: a memory time counter circuit for generating a count during a time interval controlled by the display information signal and for generating an output signal after a predetermined period of time, and having a reset terminal; a driver circuit connected to receive the output pulses from said coloring and erasing pulse generator and the output signal from said memory time counter circuit, and connected to apply an output signal to drive said electrochromic display means; refresh pulse generating means connected between the output of said memory time counter circuit and the reset terminal of said memory time counter circuit for resetting said memory time counter each time said memory time counter develops an output signal; and means for applying the display information signal to reset said memory time counter when said display information signal changes.

2. In a driving system according to claim 1, wherein said refresh pulse generating means is comprised of a delay flipflop circuit having a data input connected to receive the output of said memory time counter and having an output connected to the reset terminal of said memory time counter.

* * * * *